United States Patent [19]

Chapin

[11] 4,420,094

[45] Dec. 13, 1983

[54] VENT CAP

[76] Inventor: James P. Chapin, 1300 Arborview Blvd., Ann Arbor, Mich. 48103

[21] Appl. No.: 341,518

[22] Filed: Jan. 21, 1982

[51] Int. Cl.³ .............................................. B65D 51/16
[52] U.S. Cl. ................................................... 220/37
[58] Field of Search ............... 220/371, 367, 369, 372, 220/374, 373; 55/419

[56] References Cited

U.S. PATENT DOCUMENTS 3,622,033  11/1971  Buther .................................. 220/371

FOREIGN PATENT DOCUMENTS 2065623  7/1981  United Kingdom ................ 220/371

Primary Examiner—George T. Hall
Attorney, Agent, or Firm—Gifford, Van Ophem, Sheridan & Sprinkle

[57] ABSTRACT

An improved vent cap is disclosed comprising a body having a top wall, bottom wall and a closed side wall which together define an interior chamber. A tubular threaded member extends outwardly from the bottom wall of the body for attaching the vent cap to a desired machine while an annular filter is entrapped between the top wall and bottom wall at a position spaced inwardly from the side wall. Thus, one side of the filter is open to the interior chamber while an annular subchamber is formed between the other side of the air filter and the body side wall. At least one opening is formed through the bottom wall to the annular subchamber.

15 Claims, 3 Drawing Figures

VENT CAP

BACKGROUND OF THE INVENTION

I. Field of the Invention

The present invention relates to a vent cap.

II. Description of the Prior Art

There have been a number of previously known vent caps which are attached to and close an opening, such as the fill port for an oil reservoir, on a particular machine or device. Such vent caps typically include an air filter to remove any impurities from air entering into or exhausting from the machine opening. The previously known vent caps, however, have suffered from a number of different disadvantages.

One disadvantage of the previously known vent caps is that such caps are complex in construction and, therefore, expensive to manufacture. Furthermore, the cost of the vent cap is very important since, once the filter has become clogged with impurities, the vent cap must be replaced.

A still further disadvantage of many of the previously known vent caps is that the air filter employed within the vent cap have had a relatively small surface area. Because of the relatively small surface area of the filter used in the previously known vent caps, the air filter becomes rapidly clogged and requires replacement.

A still further disadvantage of many of the previously known vent caps is that such vent caps use only a bolt and nut arrangement to secure a dip stick, when desired, to the vent cap. After long usage, particularly in hostile operating environments, the bolt and nut tend to loosen causing the bolt or nut as well as the dip stick to fall downwardly through the opening and into the machine. Such small objects, furthermore, can cause great damage to the machine.

SUMMARY OF THE PRESENT INVENTION

The present invention overcomes the above mentioned disadvantages of the previously known vent caps by providing a vent cap which is simple and inexpensive in construction, utilizes a large surface area air filter and includes a provision for secure attachment of a dip stick to the vent cap, when desired.

In brief, the vent cap according to the present invention comprising a body having a top wall, a bottom wall and a closed side wall so that, together, the top, bottom and side wall define an interior chamber. Preferably, the body is cylindrical in shape.

A tubular member extends outwardly from the bottom wall and one end of the tubular portion is open to the interior chamber. The outwardly extending end of the tubular portion is threaded for attachment of the vent cap to a particular machine or device.

An annular air filter is entrapped between the top wall and bottom wall at a position spaced inwardly from the side wall so that one side of the filter is open to the interior chamber. Conversely, an annular subchamber is formed between the other side of the air filter and the interior surface of the side wall. At least one opening, and preferably a continuous annular opening, is formed through the bottom wall and open to the subchamber thus establishing fluid communication through the tubular portion, air filter and out through the annular opening.

In the preferred form of the invention, a threaded stud is fixedly secured to the top wall so that the stud is axially aligned with the tubular member. Thus, a dip stick can be secured to the stud, if desired, so that the dip stick extends axially outwardly through the tubular member.

The vent cap according to the present invention is simple and inexpensive in construction. Furthermore, preferably the body is constructed of relatively inexpensive and yet durable, plastic material.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
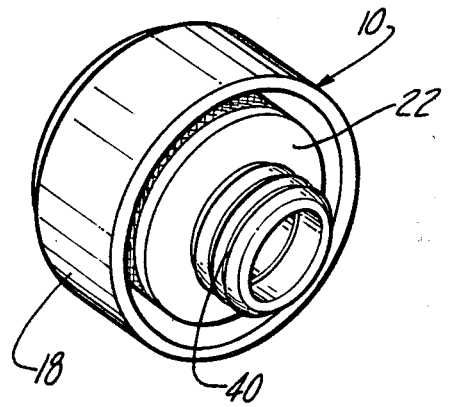
FIG. 1 is an elevational view illustrating a preferred embodiment of the vent cap according to the present invention.

With reference to the drawing, a preferred embodiment of the vent cap according to the present invention is thereshown and comprises a body 10 having a first part 12 and a second part 14. Both body parts 12 and 14 are of a one-piece construction and are preferably constructed from a plastic material.

The first body part 12 includes a circular top wall 16 and an annular side wall 18 extending axially outwardly from one side 20 of the top wall 16. A beveled portion 21 is formed between the top wall 16 and side wall 18 for a reason to be subsequently described.

The second body part includes a circular bottom wall 22 having an outer periphery 24 which terminate short of the side wall 18. A plurality of circumferentially spaced ribs 26 extend outwardly from one side 28 of the bottom wall 22 so that one edge 30 of each rib 26 flatly abuts against the inside surface 20 of the top wall 16. Furthermore, the ribs 26 are dimensioned so that, with the edges 30 of the ribs 26 abutting against the top wall 16, the bottom wall 22 is aligned with the free edge 32 of the side wall 18.

The second body part 14 also includes a tubular cylindrical member 34 integrally formed with it so that the tubular member 34 extends perpendicular to and is centered with the bottom wall 22. A portion 36 of the tubular member 34 extends inwardly from the bottom wall 22 while, conversely, a portion 38 of the tubular member 34 extends outwardly from the bottom wall 22. This outwardly extending portion 38 is externally threaded as shown at 40 for attachment of the vent cap through the desired device or machine. Although the outwardly extending portion 38 is illustrated in the drawing as externally threaded, alternatively it can be internally threaded.

Figure 2:
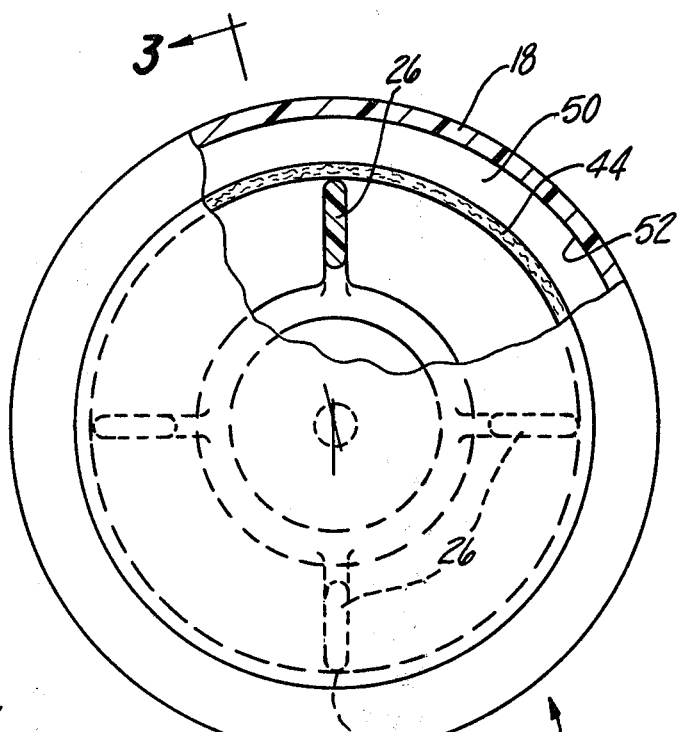
FIG. 2 is a partial sectional top view illustrating the preferred embodiment of the invention.
Figure 3:
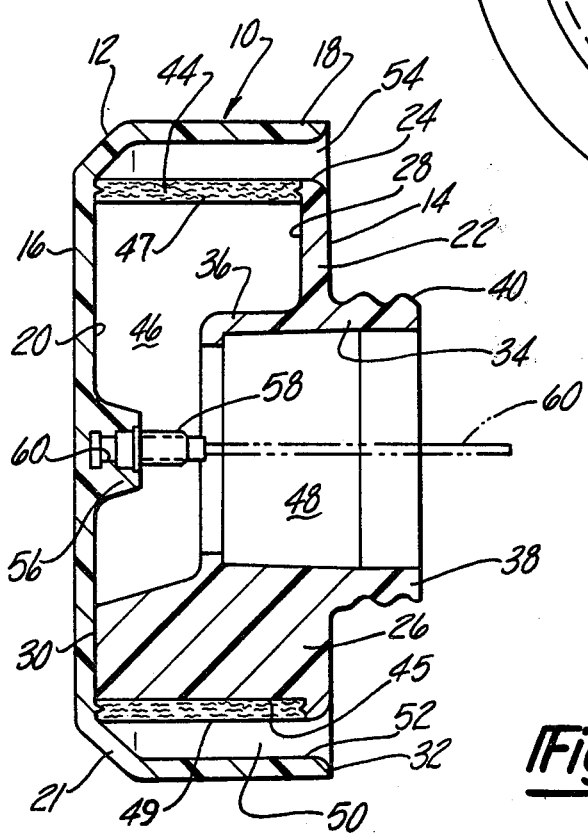
FIG. 3 is a cross sectional view taken substantially along line 3—3 in FIG. 1 illustrating the preferred embodiment of the invention.

With reference now particularly to FIGS. 2 and 3, a tubular and cylindrical or annular air filter 44 is entrapped between the outer periphery 24 of the bottom wall 22 and the inside surface 20 of the top wall 16. The beveled portion 21 on the housing first part 12 facilitates the centering of the air filter 44 with respect to the housing first part. In addition, the filter 44 is supported by the outer edges 45 of the ribs 26.

One side 47 of the air filter 44 is open to an interior chamber 46 formed in the vent cap. This chamber 46 is, in turn, open to the interior 48 of the tubular member 34 and thus open to the machine device to which the vent cap is ultimately attached. Conversely, the other side 49 of the air filter 44 is open to an annular subchamber 50 defined between the other side 49 of the air filter 44 and the inside surface 52 of the side wall 18.

The annular subchamber 50 is open exteriorly of the vent cap through an opening 54 formed through the bottom wall 14 of the housing. As illustrated in the drawing, in the preferred form of the invention this opening 54 comprises a continuous annular opening formed between the outer periphery 24 of the bottom wall 14 and the free edge 32 of the side wall 18, although other configurations can be used.

With reference now particularly to FIG. 3, the top wall 16 preferably includes a thickened portion 56 at its center so that this portion 56 is aligned with the tubular member 34. An externally threaded stud 58 is then partially embedded within a cavity 60 formed in the thickened portion 56 so that the stud 58 is substantially coaxial with the tubular member 34. In addition, the stud 58 is fixedly secured, i.e., nondetachably secured except by destruction of the vent cap, to the thickened portion 56 on the housing top wall 16. If desired, a dip stick 60 is threadably attached to the threaded stud 58 to measure the fluid level within a reservoir in the machine or device to which the vent cap is attached.

From the foregoing, it can be seen that the vent cap of the present invention is advantageous in several different respects. First, the vent cap according to the present invention can be totally constructed from only four separate elements, i.e., the first body part 16, second body part 14, air filter 44 and, if a dip stick is desired, the threaded stud 58. Thus, assembly time and cost is minimized. Furthermore, all of these components can be very inexpensively obtained thus minimizing the material cost for the vent cap.

A still further advantage of the vent cap according to the present invention is that the air filter 44 has a relatively high surface area thus enabling long usage of the vent cap before clogging of the air filter 44 occurs.

Having described my invention, however, many modifications thereto will become apparent to those skilled in the art to which it pertains without deviation from the spirit of the invention as defined by the scope of the appended claims.

I claim:

1. A vent cap comprising:
    a body having a top wall, a bottom wall and a closed side wall, said top, bottom and side walls defining an interior chamber,
    a plurality of circumferentially spaced ribs extending and secured between the top and bottom walls,
    a tubular member extending outwardly from the bottom wall, said tubular member having threads formed on its outwardly extending end and open at its other end to said chamber,
    an annular filter entrapped between the top wall and bottom wall at a position spaced inwardly from said side wall so that one side of said filter is open to the interior chamber, said filter forming an annular subchamber between the air filter and the closed side wall, and
    at least one opening formed through said bottom wall and open to said annular chamber.

2. The invention as defined in claim 1 wherein said opening comprises a continuous annular opening formed through the bottom wall.

3. The invention as defined in claim 1 wherein said body comprises a first part and a second part, said first body part comprising the top wall and side wall, said second body part comprising said bottom wall, said tubular member and ribs, and each of said body parts being of a one-piece construction.

4. The invention as defined in claim 3 wherein said body parts are constructed of plastic.

5. The invention as defined in claim 1 wherein the outer edges of said ribs abut against and support said filter.

6. The invention as defined in claim 1 and comprising a threaded stud fixedly secured to said top wall at a position aligned with said tubular member.

7. The invention as defined in claim 6 and comprising a dip stick and means for attaching said dip stick to said stud so that said dip stick extend axially through the tubular member.

8. The invention as defined in claim 1 and including a beveled portion between said top wall and said side wall.

9. A vent cap comprising:
    a body having a top wall, a bottom wall and a closed side wall, said top, bottom and side walls defining an interior chamber,
    a tubular member extending outwardly from the bottom wall, said tubular member having threads formed on its outwardly extending end and open at its other end to said chamber,
    an annular filter entrapped between the top wall and bottom wall at a position spaced inwardly from said side wall so that one side of said filter is open to the interior chamber, said filter forming an annular subchamber between the air filter and the closed side wall, and
    a threaded stud fixedly secured to said top wall at a position aligned with said tubular member.

10. The invention as defined in claim 9 wherein said opening comprises a continuous annular opening formed through the bottom wall.

11. The invention as defined in claim 9 and comprising a plurality of circumferentially spaced ribs extending and secured between the top and bottom walls,
    wherein said body comprises a first part and a second part, said first body part comprising the top wall and side wall, said second body part comprising said bottom wall, said tubular member and said ribs, and each of said body parts being of a one-piece construction.

12. The invention as defined in claim 11 wherein said body parts are constructed of plastic.

13. The invention as defined in claim 11 wherein the outer edges of said ribs abut against and support said filter.

14. The invention as defined in claim 9 and comprising a dip stick and means for attaching said dip stick to said stud so that said dip stick extends axially through the tubular member.

15. The invention as defined in claim 9 and including a beveled portion between said top wall and said side wall.

* * * * *